No. 704,518.　　　　　　　　　　　　　　　　　　　Patented July 15, 1902.
F. A. COLLVER.
HAND CORN PLANTER.
(Application filed July 17, 1901.)
(No Model.)
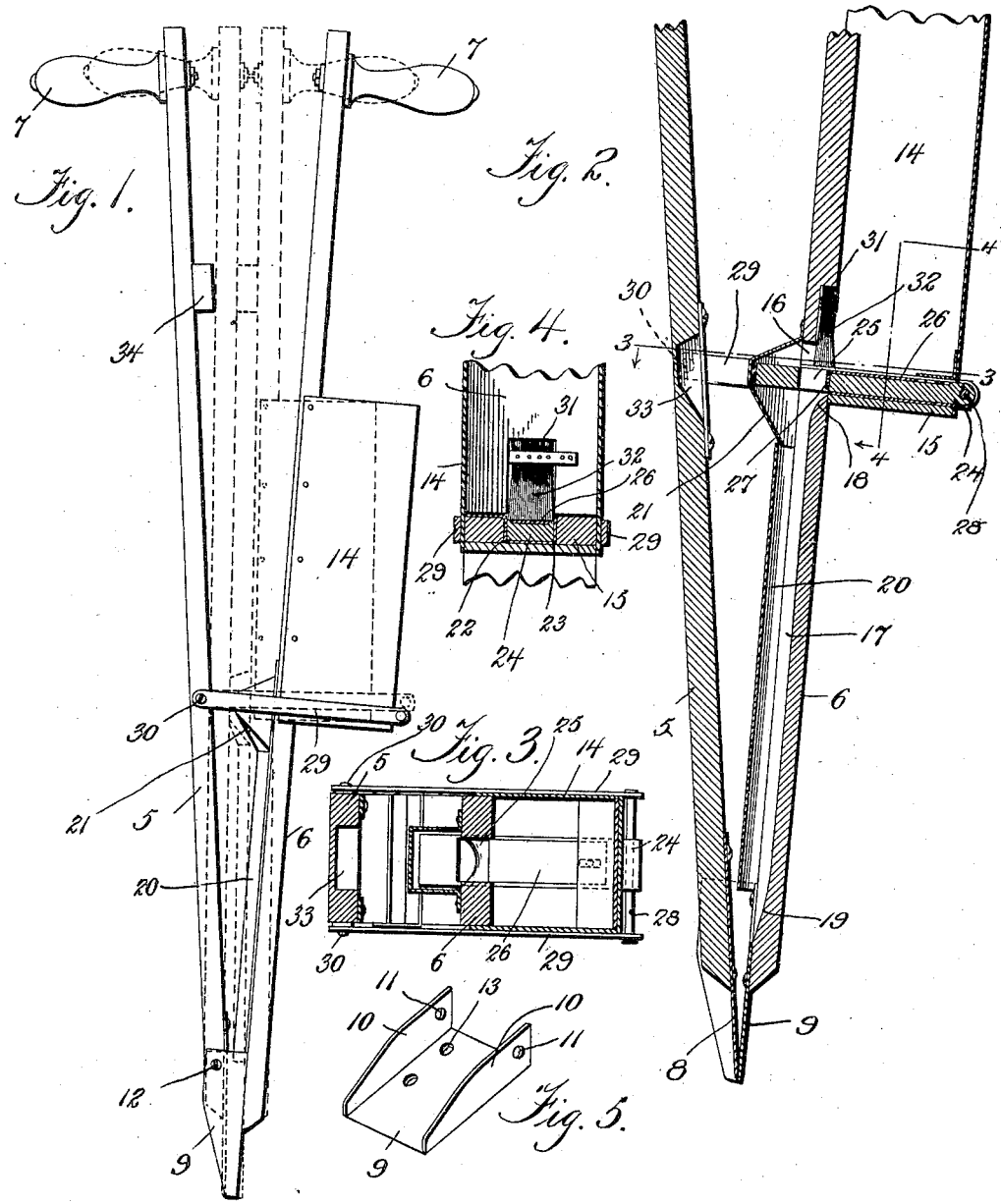
Witnesses:　　　　　　　Fred Allen Collver, Inventor.

UNITED STATES PATENT OFFICE.

FRED ALLEN COLLVER, OF VITTORIA, CANADA.

HAND CORN-PLANTER.

SPECIFICATION forming part of Letters Patent No. 704,518, dated July 15, 1902.

Application filed July 17, 1901. Serial No. 68,561. (No model.)

*To all whom it may concern:*

Be it known that I, FRED ALLEN COLLVER, a subject of the King of Great Britain, residing at Vittoria, county of Norfolk, Province of Ontario, Canada, have invented certain new and useful Improvements in Hand Corn-Planters; and I do hereby declare that the following is a full, clear, and exact description of the invention, such as will enable others skilled in the art to which it appertains to make and use the same.

My invention relates to improvements in hand corn-planters; and the objects that I have in view are to provide a simple and inexpensive implement equipped with means for operating the seed-dropping devices and with means for readily penetrating the soil so as to deposit the seed below the surface of the ground, to automatically discharge the seed in regulated quantities from the hopper of the implement, to provide for the regulation of the effective area of the seed-opening in the dropping devices, and to prevent the seed from escaping too rapidly from the hopper on the operation of the seed-dropping devices.

With these ends in view the invention consists in the novel combination, construction, and arrangement of parts, which will be hereinafter fully described and claimed.

In the drawings hereto annexed, forming a part of this specification, Figure 1 is a side elevation of a hand corn-planter embodying my improvements. Fig. 2 is a vertical longitudinal sectional view through the implement with the upper part thereof broken away. Fig. 3 is a sectional plan view, the plane of the section being indicated by the dotted line 3 3 on Fig. 2. Fig. 4 is a detail transverse section through the hopper, the plane of the section being indicated by the dotted line 4 4 on Fig. 2. Fig. 5 is a detail perspective view of one of the foot-plates detached from the implement.

The same numerals of reference denote like parts in all the figures of the drawings.

5 6 designate a pair of handle-bars, which are hingedly connected together at their lower ends and are provided at their upper ends with the handles 7, the latter adapted to be grasped by the two hands of the operator for the purpose of giving a downward thrust to the implement and for moving the bars laterally with respect one to the other, so as to make them assume the positions indicated by full and dotted lines in Fig. 1. The bar 5 is provided at its lower end with a flat straight foot-plate 8, that is adapted to be secured by any suitable means to the inner face of the handle-bar. The other bar 6 is provided with a flanged foot-plate 9, the same having the parallel tapering flanges 10, which are arranged to embrace the side edges of the bar 5 and are provided with perforations 11, through which are adapted to pass the screws 12. The foot-plate 9 is furthermore provided with the screw-holes 13, through which are adapted to pass suitable fasteners, by which the plate 9 is secured to the inner face of the bar 6. It will be observed that the two foot-plates are disposed in opposing relation, as shown by Fig. 2, and that the flanged foot-plate 9 is secured firmly to one bar and has a pivotal connection at 12 with the other bar. This pivotal connection between the flanged foot-plate and the bar 5 serves as an eccentric connection between the two handle-bars and permits them to be vibrated laterally with respect to one another, which adjustment operates to open and close the two foot-plates, as is required in the operation of the implement, so that the foot-plates may be closed by spreading the bars apart to the full-line position of Fig. 1 after the foot-plates shall have penetrated the soil for the purpose of spreading the foot-plates in order to discharge the seed therefrom.

14 designates a hopper which is secured in any suitable way upon the bar 6, said hopper being provided with a bottom 15. The hopper may be made of sheet metal, while the bottom thereof may be made of wood; but the materials employed may be varied within the skill of the constructor. The bar 6 is provided with a transverse slot or opening 16, which is formed in a plane above the hopper-bottom and is arranged to have communication with the chamber of the hopper. The bar 6 is furthermore provided with a vertical longitudinal channel 17, which extends from the bottom of the hopper to a point at or near the foot-plate 9, the upper end of said channel being inclined or rounded, as at 18, so as to merge into the slot 16, while the lower end of the channel 17 is inclined or rounded, as at 19, so as to properly discharge the seed to the foot-plate 9.

20 designates a chute which is secured to the inner face of the bar 6 and is arranged to inclose the channel 17, said chute extending from a point near the hopper down to and within the limits of the flanged foot-plate 9. The upper part of this chute is enlarged, as at 21, and is offset laterally beyond the chute proper, 20, said offset portion at the upper extremity of the chute lying opposite to and inclosing the slot 16, through which the seed is discharged from the hopper.

The bottom 15 of the hopper is provided with a longitudinal slot 22, which opens into the slot 16 of the handle-bar 6, and the hopper-bottom and its slot 22 are lined by a metallic wear-plate 23, the latter being bent in order to fit into the slot 22 and to cover the top face of the hopper-bottom 15.

24 designates a seed-dropping slide which is arranged to snugly fill the slot 22 of the hopper and to extend through the slot 16 and into the chamber afforded by the offset portion 21 of the chute. This slide is provided near its inner end with a slot 25, and said slide carries an adjustable regulating-plate 26, the same having a depending lip 27, that is arranged to fit into an end portion of the slot 25 of said dropping-slide. The regulating-plate is secured adjustably to the dropping-slide by any suitable means—such, for example, as a screw adapted to pass through a slot in the regulating-plate and to fasten the latter to the slide. It is evident that the regulating-plate may be adjusted on the slide in order that its lip 27 may lie at one end of the slot 25 in the position shown by Fig. 2; but the position of the plate may be shifted, so as to advance the lip 27 toward the other end of the slot, thereby reducing the effective area of the slot 25 and also reducing the carrying capacity of the slide.

The dropping-slide 24 extends through the outer wall of the hopper in order that it may be exposed for the attachment of a cross-rod 28, the latter having its end portions secured to the pair of bars or plates 29, which are disposed on opposite sides of the hopper and are arranged to span the space between the two bars 5 6 and to have their outer ends pivoted at 30 to the handle-bar 5. The dropping-slide is thus operatively connected to one handle-bar, while at the same time it has slidable relation to the other handle-bar, 6, and the hopper which is mounted thereon. With the handle-bars in the open position shown by Figs. 1 and 2 the slide is in a position for its slot 25 to drop the seed through slot 16 and into the seed-conduit which is formed by the channel 17 and the chute 20. By moving the handle-bars to the dotted-line position of Fig. 1 the hopper is made to receive the slide, so that seed from the hopper will enter the slot 25, and on the next operation of the handle-bars the dropping-slide will be carried to the position shown by Fig. 2 in order to discharge the seed from the slot 25 in said hopper. The handle-bar 6 is provided above the slot 16 with a recess 31, in which is secured a brush 32, that extends below the top edge of the slot 16 and is arranged to frictionally sweep the top face of the slide and the regulating-plate 26 thereof, thus preventing the grain from escaping through the slot 16 except when the grain occupies the slot 25 of the dropping-slide.

The handle-bar 5 is provided on its inner face with a recess 33, adapted to receive the offset or enlarged portion 21 at the upper end of the chute. Said handle-bar 5 is furthermore provided with a stop-block 34, and the enlargement 21 of the chute and the block 34 are adapted to impinge the handle-bars in order to limit the inward movement of the parts when they are brought to the dotted-line position of Fig. 1.

Changes within the scope of the appended claims may be made in the form and proportion of some of the parts, while their essential features are retained and the spirit of the invention is embodied. Hence I do not desire to be limited to the precise form of all the parts as shown, reserving the right to vary therefrom.

Having thus described my invention, what I claim as new is—

1. A seed-planter comprising the handle-bars, a hopper, an imperforate hood secured to one handle-bar opposite to an opening therein, a conduit leading from the hood, a dropping-slide adapted to project into and to terminate within said hood, links pivoted to one handle-bar and embracing opposite sides of the two handle-bars, and a pivotal bolt connecting the other ends of said links and the dropping-slide together, substantially as described.

2. A seed-planter consisting of a pair of handle-bars pivoted together at their lower portion, a seed-hopper carried by one of said handle-bars and having a feed-opening in the lower side thereof, a closed imperforate channel or conduit leading from the feed-opening to the lower end of the planter, a slide with a feed-slot therein reciprocating in said feed-opening and projecting from the rear side of the hopper, and a pair of connecting link-rods pivotally connected to each side of the opposite handle-bar and to the outer rearwardly-extending end of said slide to reciprocate the latter, whereby said link-rods embrace the hopper and both handle-bars to form guides for the latter.

3. A seed-planter consisting of a pair of handle-bars pivoted together at their lower portion, a seed-hopper carried by one of said handle-bars and having a feed-opening in the lower side thereof, a closed imperforate channel or conduit leading from the feed-opening to the lower end of the planter, and means for feeding grain through said slot and channel, said means being operated by the opening and closing of the handle-bars.

4. A seed-planter consisting of a pair of handle-bars pivoted together at their lower portion, a seed-hopper carried by one of said handle-bars and having a feed-opening in the lower side thereof, a closed imperforate channel or conduit leading from the feed-opening to the lower end of the planter, a reciprocating slide operating in the feed-opening to measure grain, and means connected to said slide and to the opposite handle-bar to reciprocate the same by the opening and closing of the handle-bars to feed grain from the hopper, whereby no opening is left for the escape of grain between the hopper and the lower end of the conduit.

5. A seed-planter consisting of a pair of handle-bars pivoted together at their lower portion, a seed-hopper carried by one of said handle-bars and having a feed-opening in the lower portion thereof, a feed device operating in said feed-opening to measure out grain and extending rearwardly through an opening at the outer side of the hopper, and a pair of link-rods pivotally connected to said feed device at each side of the hopper and also pivotally connected to the opposite handle-bar, whereby to form at once a means for operating the feed device and to form guides for the handle-bars.

6. A seed-planter consisting of a pair of handle-bars pivoted together at their lower portion, a seed-hopper carried by one of said handle-bars and having a feed-opening in the lower side thereof, a closed imperforate channel or conduit leading from the feed-opening to the lower end of the planter, a slide with a feed-slot therein reciprocating in said feed-opening, means for operating said slide by the opening and closing of the handle-bars, an adjustable sliding plate projecting across the rear portion of said feed-slot and extending rearwardly flush with the reciprocating slide and having a longitudinal adjusting-slot therein projecting outside of the hopper when the handles are closed together, and a screw passing through said longitudinal slot and secured in the slide and also projecting outside the hopper when the handles are closed together, whereby the width of the feed-slot may be adjusted externally of the handle-bars.

In witness whereof I have hereunto set my hand in the presence of two witnesses.

FRED ALLEN COLLVER.

Witnesses:
  H. D. PETRIE,
  CLARA A. McKIEE.